Patented Mar. 8, 1949

2,463,927

UNITED STATES PATENT OFFICE 2,463,927

LIGHTWEIGHT COATED AGGREGATE AND METHOD OF MAKING

Vilas E. Watts, Evanston, Ill., assignor to Materials Engineering Corporation, Chicago, Ill., a corporation of Illinois No Drawing. Application July 11, 1946, Serial No. 682,937

10 Claims. (Cl. 117—16)

This invention relates to light weight aggregate for use in the production of low density bound compositions such as low density concrete.

Low density concretes or bound compositions comprising hydraulic binders and light weight aggregates have become of significant importance in many phases of industry during recent years. The use of these low density compositions permits the manufacture of structural materials of light weight having varying degrees of insulation value and fire resistance properties while, at the same time, supplying structural materials of adequate strength to meet most requirements.

In the prior art practices, however, these low density bound compositions have presented several problems which have militated against their efficient and wide use.

The light weight aggregates employed in producing low density bound compositions are of significant value primarily because of their air content, and those having the greatest value because of their high air content present the greatest difficulties in handling and use.

One significant problem is occasioned by the tendency of air-containing light weight aggregates to float when they are put into suspension with hydraulic binders while the heavier binders settle to the bottom. This difficulty occasions serious non-uniformity in the final product due to segregation and stratification.

A further problem is presented due to the high absorption of the light weight aggregate for liquids which necessitates the employment of excessive amounts of liquid before both the demand of the aggregate and the demand of the hydraulic binder can be satisfied.

Still a further difficulty is created by the tendency of the structurally weak air-containing light weight aggregates to be crushed during manipulation, thereby releasing a considerable amount of the valuable air component from the mixture. The losses of air from the mixture go far to defeat the purpose of the employment of the light weight aggregates. They become economic losses since they result in the production of a smaller volume of final product with non-uniformity in strengths, densities, and insulating values, which create serious engineering problems.

Still a further problem presented in the prior art practices of producing low density bound compositions through the employment of light weight aggregate centers around the high capillary absorption of moisture occasioned by the porosity of the product. The products thus take up very considerable amounts of water under service conditions, which adversely affects the efficiency of such products in use.

The present invention has for its object the elimination of the foregoing difficulties through an appropriate pre-treatment of the air-containing light weight aggregates in such manner that when they are used in making hydraulic mixtures the foregoing objectionable features are avoided. Generally speaking, this is accomplished in accordance with the present invention by adding to the aggregate, preferably at the point of its manufacture, a small amount of a chemical agent sufficient substantially to inhibit release of air and break down of the air-containing aggregate upon mixture with a hydraulic binder.

The chemical agent employed as the inhibitor should have a number of essential characteristics, among which may be enumerated the following:

(1) High efficiency as a film-forming agent and surface tension-reducing agent for the liquid phase of the hydraulic mixture. This property renders the inhibitor effective in surrounding air released by the air-containing aggregate during the process of mixing with the hydraulic binders, thus preventing air losses.

(2) High efficiency in film-strengthening characteristics to thereby prevent destruction of surrounded air cells and their eventual coalescence during agitation and handling of the hydraulic mix.

(3) High resistance to rapid chemical reaction with other chemical ingredients of the hydraulic mixture which tend to reduce or destroy the foregoing effects of the inhibitor prior to the set of the binder. This high resistance to chemical reaction is particularly desirable to prevent loss of air from the mixture and resultant shrinkage before the binder has set to produce a supporting structure.

(4) Exceedingly rapid and substantially complete water solubility. This feature is essential in order to allow the chemical inhibitor, with which the aggregate is treated, to become effective immediately upon addition of the treated aggregate to the water and hydraulic binder mixture, and to render the chemical inhibitor effective in small quantities.

(5) The chemical inhibitor must not adversely interfere with the setting and strength of the hydraulic binder.

(6) The chemical inhibtor should be one that will undergo slow conversion to a water-insoluble form on reaction with the heavy positive ions of the hydraulic binder to form water-proofing films and thereby effectively reduce the capillary absorption of moisture by the formed products.

(7) The chemical inhibitor should be substantially non-hygroscopic so that it will not itself attract moisture from the air during storage of the pre-treated aggregate, which would occasion objectionable caking or lumping.

(8) The chemical inhibitor must be chemically stable in storage, resisting any form of conversion or decomposition which would reduce its efficiency in use.

(9) The chemical inhibitor must be immune to the action of bacteria or chemical decomposition, both while carried on the aggregate before admixture with the hydraulic binder and after its use in a formed composition. This attribute of the chemical inhibitor is necessary to maintain its full effectiveness and to prevent formation of deleterious odors which would materially limit the field of use of the final compositions.

(10) Finally, the chemical inhibitor should be capable of assuming a form that renders it easily handled in the treatment of the air-containing aggregate.

The foregoing valuable and essential characteristics have been found to be possessed by alkali metal salts of a certain naphtha insoluble resin produced from pine wood under conditions yielding neutral compounds. Appropriate alkali metal salts of such resin are certain reaction products of sodium or potassium hydroxide and the naphtha insoluble pine wood resin.

The resin contemplated by the present invention is produced by extracting pine wood with a hydrocarbon solvent such as benzol to form a preliminary extract consisting, after evaporation of the solvent, of a mixture of turpentine, pine oil, rosin, and the resin appropriate for use in practicing the present invention; the turpentine and the pine oil are removed from the mixture by distillation, following which the remaining mixture is extracted with a preferential solvent, for example, a petroleum hydrocarbon such as petroleum ether or gasoline, which removes the rosin, leaving a dark colored resinous substance which, when freed from the excess solvent, forms the resin contemplated by the present invention. The method of producting this resin is fully described in the specification of U. S. Letters Patent No. 2,193,026, granted March 12, 1940. This resin is further characterized by a methoxy content of from 3% to 6%, a melting point by the drop method within the limits of about 115° C. to 125° C., and an acid number of about 100. The resin can be saponified by treatment with a solution of potassium hydroxide, for example, to produce a saponified resin solution in the manner more particularly described in the specification of U. S. Letters Patent No. 2,199,206, granted April 30, 1940.

The defined resin is known in the trade as "Vinsol" resin.

Only those alkali metal salts of the said resin prove fully effective which have been produced through the reaction of a sufficient quantity of the alkali metal with the resin to form substantially neutral compounds. It has been found that alkali metal hydroxides will react with the resin in varying proportions. Thus, one pound of sodium or potassium hydroxide can be reacted with 100 pounds of the resin to form an apparent sodium salt which, however, is low in solubility and other desirable properties. It has also been found that 5 pounds of sodium or potassium hydroxide will react with 100 pounds of such resin with the production of an apparent salt having a higher degree of solubility and increased effectiveness in film-forming properties.

The products preferred in accordince with the present invention, however, should be made by reacting larger amounts of the alkali metal hydroxide with the resin. Suitable alkali metal salts of the resin for employment in accordance with the present invention may be produced by reacting approximately 10 to 12 pounds of sodium or potassium hydroxide with 100 pounds of the resin. The resulting reaction product constitutes a neutral compound having a high degree of solubility as well as a high rate of solubility, which are both essential to maximum effectiveness in accordance with the present invention.

The reason for the differences in the character of alkali metal salts produced from the resin when reacted with varying amounts of alkali metal hydroxide is not altogether clear. It is believed, however, that the lower alkali concentration results in a reaction with only the lower molecular weight acids in the resin, leaving the higher molecular weight substances substantially in their initial resinous form. Apparently, only with higher concentrations of alkali is it possible to convert the high molecular weight products in the resin to highly soluble salts.

It further appears that the higher molecular weight products of the resin yield the most effective film forming and film-stabilizing agents, possessing high resistance to rapid chemical conversion but susceptible to slow conversion to water insoluble products when in solution with heavy ions such as the calcium ions present in a hydraulic mixture.

In this specification and the appended claims, therefore, when reference is made to an alkali metal salt of the resin or to a species under this genus, it is to be understood that the salt referred to is the reaction product of the resin and a sufficient amount of an alkali metal to yield a substantially neutral product. It is preferred, in accordance with the present invention, to prepare the water soluble alkali metal salt of the resin in the form of an extremely fine, low-temperature, air-dried powder. Since rapid and virtually complete solubility of the inhibitor is necessary, it will be appreciated that the finer the powder, the more satisfactory for the purposes of this invention.

It has been found advantageous to treat the light weight air-containing aggregate with the chemical inhibitor, namely the alkali metal salt of the resin hereinbefore specifically described, by dusting the chemical inhibitor on the surface of the aggregate. It is particularly desirable that the inhibitor be dusted or deposited on the surface of the aggregate under conditions such as will preclude coalescence of the discrete particles of the inhibitor. This is desirable to the end that the ready and complete solubility of the inhibitor may be maintained so that it will become immediately effective upon contact with the water employed in hydrating a hydraulic binder.

While it is preferred to apply the chemical inhibitor by dusting the same in the form of an air-dried powder on the surface of the light weight air-containing aggregate, it can be applied through the medium of a spray of a liquid solution thereof. However, the continued presence of the water of such a solution is not desirable, usually necessitating the drying of the aggregate before it is supplied to the ultimate user.

The invention is applicable to the treatment of various light weight air-containing aggregates, such as expanded vermiculite, rock wool pellets, asbestos, light weight air-containing volcanic or manufactured porous aggregates, air-containing organic materials, and the like.

Varying quantities of the chemical inhibitor in the form of the alkali metal salts of the resin may be applied to the air-containing aggregate depending on the specific use for which it is intended. As little as .01 pound of an alkali metal salt of the resin per cubic foot of light weight air-containing aggregate has been found to materially assist in preventing escape of air from the light weight aggregate upon admixture with water and a hydraulic binder. Such a small quantity does not, however, furnish the optimum characteristics desired.

When using such a small quantity of the chemical inhibitor, some coalescence of air particles has been noted during and after pouring of the composition and prior to the set of the binder. Furthermore, such a small quantity has been found insufficient to furnish substantial ultimate water resistance to the product. Substantially greater proportions of the chemical inhibitor give improved qualities, and a preferred range has been found to lie within the limits of .05 pound to .15 pound of the alkali metal salt of the resin per cubic foot of the light weight air-containing aggregate. This is merely a preferred range, and it will be appreciated that substantially greater quantities of the salt per cubic foot of aggregate may be used, particularly where water resistance is most essential and slow set and strength are of less importance.

Particularly advantageous results have been obtained when employing approximately 0.10 pound of the alkali metal salt of the resin to each cubic foot of aggregate treated. The product of this treatment has been found to provide a very stable composition, in which the air cells remain wholly intact until the hydraulic binder has set, and furthermore the ultimate product possesses a high degree of water resistance. No segregation of the various compounds within the hydraulic mixture occurs, and there is no noticeable shrinkage in volume. The chemically inhibited, low density, air-containing aggregate of the present invention is adapted for use in various bound compositions, more particularly those of the low density concrete type. By bound compositions, however, those containing Portland cement, gypsum and lumnite cements, glues, dextrons, starches, water-soluble synthetic resins, and the like, are intended.

It is important that the chemical inhibitor in the form of the alkali metal salt of the resin be applied to the aggregate at a temperature below that at which the inhibitor will melt and occasion coalescence of the discrete particles thereof.

By way of exemplification of the treatment of expanded vermiculite, the process of preparing the aggregate of the present invention may be carried out as follows.

Vermiculite is passed through the expanding furnace wherein it reaches a temperature of between approximately 1800° F. and 2200° F. The expanded vermiculite is then dropped from the furnace into a conveyor, where a blast of air separates the light weight expanded vermiculite from any unexpanded rock. The expanded vermiculite usually leaves this step of the process at a temperature of between approximately 500° F. and 1200° F.

In accordance with the present invention, this expanded vermiculite is passed through an enlarged conveyor where cool air is circulated up through the expanded vermiculite to carry away heat. This cooling is continued until the vermiculite is brought to a temperature between approximately 100° F. and 200° F., i. e. a temperature below the melting point of the alkali metal salts of the resin. The expanded vermiculite at this lower temperature is passed through a measuring orifice, and finally powdered alkali metal salt of the resin is fed into the expanded vermiculite in the correct proportions. The powdered inhibitor is thoroughly and completely mixed with the expanded vermiculite as the mixture is conveyed by suitable belts through bagging hoppers, and ultimately into the final package, which conventionally takes the form of a 4 cubic foot paper bag.

The thus chemically inhibited air-containing light weight aggregate is in a condition to be supplied to the ultimate user for the production of a low density bound composition. A typical composition that has given excellent results is as follows:

One 100 pound bag of Portland cement is mixed with 14 gallons of water, preferably in a plaster-type power mixer, and to this fluid mortar there is added 4 cubic feet of air-containing expanded vermiculite, carrying on the surface thereof 0.10 pound of highly soluble, finely divded, alkali metal salt of the resin hereinbefore described per cubic foot of the expanded vermiculite. The materials are mixed together until a uniform mixture of pourable consistency is produced, which, upon setting, provides an excellent low density concrete structure. The mixture while of pourable consistency may be poured into forms to produce slabs or blocks of any desired form, or it may be used to pour monolithic floors, walls, or roofs to form insulating concrete structures.

Having thus described my invention, what I claim is:

1. A light weight aggregate for use in producing low density bound compositions comprising a light weight air containing porous aggregate having distributed on the surface thereof at least substantially 0.05 pound of a highly water soluble, finely divided, uncoalesced alkali metal salt of a resin per cubic foot of said aggregate, said resin being the petroleum hydrocarbon insoluble portion of pine wood resin.

2. A light weight aggregate for use in producing low density bound compositions comprising air containing expanded vermiculite having distributed on the surface thereof at least substantially 0.05 pound of a highly soluble, finely divided, uncoalesced alkali metal salt of a resin per cubic foot of said vermiculite, said resin being the petroleum hydrocarbon insoluble portion of pine wood resin.

3. A light weight aggregate for use in producing low density bound compositions comprising air containing expanded vermiculite having distributed on the surface thereof at least substantially 0.05 pound of a highly soluble, finely divided, uncoalesced sodium salt of a resin per cubic foot of said vermiculite, said resin being the petroleum hydrocarbon insoluble portion of pine wood resin.

4. A light weight aggregate for use in producing low density bound compositions comprising air containing expanded vermiculite having distributed on the surface thereof at least substantially 0.05 pound of a highly soluble, finely divided, uncoalesced potassium salt of a resin per cubic foot of said vermiculite, said resin being the petroleum hydrocarbon insoluble portion of pine wood resin.

5. A method for producing a light weight aggregate for use in low density bound compositions comprising forming an air containing, porous aggregate, depositing on the surface of such aggregate at least substantially 0.05 pound of a highly soluble, finely divided alkali metal salt of a resin per cubic foot of said aggregate, while said aggregate is maintained at a temperature below that at which the finely divided particles of said alkali metal salt of the resin are coalesced, said resin being the petroleum hydrocarbon insoluble portion of pine wood resin.

6. A method for producing a light weight aggregate for use in low density bound compositions comprising expanding vermiculite at a temperature between approximately 1800° F. and approximately 2200° F., then cooling the expanded vermiculite to a temperature not substantially above 200° F., thereafter distributing on the surface of said expanded vermiculite while at said lower temperature at least substantially 0.05 pound of a highly soluble, finely divided alkali metal salt of a resin per cubic foot of said expanded vermiculite, said resin being the petroleum hydrocarbon insoluble portion of pine wood resin.

7. A light weight aggregate for use in producing low density bound compositions comprising a light weight air containing porous mineral aggregate having distributed on the surface thereof at least substantially 0.05 pound of a highly water soluble, finely divided uncoalesced alkali metal salt of a resin per cubic foot of said aggregate, said resin being the petroleum hydrocarbon insoluble portion of pine wood resin.

8. A light weight aggregate for use in producing low density bound compositions comprising a light weight air containing porous expanded mineral aggregate having distributed on the surface thereof at least substantially 0.05 pound of a highly water soluble, finely divided uncoalesced alkali metal salt of a resin per cubic foot of said aggregate, said resin being the petroleum hydrocarbon insoluble portion of pine wood resin.

9. A method for producing a light weight aggregate for use in low density bound compositions comprising forming a light weight, air containing, porous mineral aggregate, distributing on the surface thereof at least 0.05 pound per cubic foot of said aggregate, of a highly soluble, finely divided, uncoalesced alkali metal salt of a resin while said aggregate is maintained at a temperature below that at which the finely divided particles of said alkali metal salt of the resin are coalesced, said resin being the petroleum hydrocarbon insoluble portion of pine wood resin.

10. A method for producing a light weight aggregate for use in low density bound compositions comprising forming a light weight, air containing, porous, expanded mineral aggregate, distributing on the surface thereof at least 0.05 pound per cubic foot of said aggregate, of a highly soluble, finely divided, uncoalesced alkali metal salt of a resin while said aggregate is maintained at a temperature below that at which the finely divided particles of said alkali metal salt of the resin are coalesced, said resin being the petroleum hydrocarbon insoluble portion of pine wood resin.

VILAS E. WATTS.

REFERENCES CITED

The following references are of record in the file of this patent:

UNITED STATES PATENTS

| Number | Name | Date |
|---|---|---|
| 1,351,087 | Sutter | Aug. 31, 1920 |
| 1,972,390 | Miner | Sept. 4, 1934 |
| 2,354,156 | Sucetti | July 18, 1944 |
| 2,397,083 | Bellamy | Mar. 26, 1946 |